(12) United States Patent
Rüger et al.

(10) Patent No.: US 8,603,204 B2
(45) Date of Patent: Dec. 10, 2013

(54) DEVICE AND METHOD FOR GENERATING A SYNTHESIS GAS FROM PROCESSED BIOMASS BY ENTRAINED-FLOW GASIFICATION

(75) Inventors: Dietmar Rüger, Bannewitz (DE); Olaf Schulze, Tuttendorf (DE); Anton Althapp, Oberschöna (DE); Christian Eichhorn, Pfaffenhofen (DE); Horst Kretschmer, Weißenborn (DE)

(73) Assignee: Linde AG, Munich (DE)

( * ) Notice: Subject to any disclaimer, the term of this patent is extended or adjusted under 35 U.S.C. 154(b) by 0 days.

(21) Appl. No.: 13/511,243

(22) PCT Filed: Nov. 26, 2010

(86) PCT No.: PCT/EP2010/007181
§ 371 (c)(1),
(2), (4) Date: Jul. 20, 2012

(87) PCT Pub. No.: WO2011/063971
PCT Pub. Date: Jun. 3, 2011

(65) Prior Publication Data
US 2012/0280181 A1   Nov. 8, 2012

(30) Foreign Application Priority Data
Nov. 27, 2009  (DE) .......................... 10 2009 055 976

(51) Int. Cl.
*B01J 7/00*  (2006.01)
*C01B 3/36*  (2006.01)
*C01B 6/24*  (2006.01)
*C10J 3/00*  (2006.01)
*C10J 3/08*  (2006.01)

(52) U.S. Cl.
USPC ................... 48/61; 48/210; 48/62 R; 423/644

(58) Field of Classification Search
USPC ................. 48/61, 62 R, 197 R, 210; 423/644
See application file for complete search history.

(56) References Cited

U.S. PATENT DOCUMENTS 5,849,050 A   12/1998  Wolf
2007/0079554 A1   4/2007  Schingnitz et al.
(Continued)

FOREIGN PATENT DOCUMENTS

AU   2007340905 A1   7/2008
CL   09-0191   1/2009
(Continued)

OTHER PUBLICATIONS

International Preliminary Report on Patentability, PCT/EP2010/007181, Jun. 14, 2012, 8 pgs.
(Continued)

*Primary Examiner* — Matthew Merkling
(74) *Attorney, Agent, or Firm* — Paul D. Strain, Esq.; Strain & Strain PLLC

(57) ABSTRACT

The present invention relates to a device for generating a synthesis gas (SG) from biomass (BM) by entrained-flow gasification. The device comprises a treatment plant (1), in which the biomass (BM) is supplied to a coarse crushing device (2), which is connected downstream via a first lock (3) to a pressurized carbonization plant (4) for the hydrothermal generation of carbonization char (KK) from the biomass (BM). The carbonization plant (4) comprises at least one preheating device (5) and a carbonization reactor (6) arranged downstream of the preheating device (5) and is connected downstream via a second lock (11) to at least one solid-liquid separation device (12, 13) for providing a fuel. A drying device (16) for drying the fuel is provided downstream of the solid-liquid separation device (12, 13), with a crushing device (18) for crushing the fuel to form pulverized fuel (BS) having particle sizes in the range of 55 μm to 500 μm being connected downstream of the drying device. The device further comprises a transfer device (21) for transferring the fuel to an entrained-flow gasification plant (22), whereby a coupling of the treatment plant (1) to the entrained-flow gasification plant (22) is provided. The present invention further relates to a method for generating a synthesis gas (SG) from biomass (BM) by entrained-flow gasification using a device according to the invention.

8 Claims, 1 Drawing Sheet

(56) References Cited

U.S. PATENT DOCUMENTS

2008/0307703 A1* 12/2008 Dietenberger et al. ............ 48/76
2009/0056225 A1* 3/2009 Schinski ...................... 48/198.7

FOREIGN PATENT DOCUMENTS

| | | |
|---|---|---|
| CN | 1473188 A | 2/2004 |
| CN | 1919980 A | 2/2007 |
| CN | 1944593 A | 4/2007 |
| CN | 101255362 A | 9/2008 |
| DE | 20 2007 016 454 U1 | 2/2008 |
| DE | 10 2007 012 122 B3 | 5/2008 |
| DE | 10 2007 062 811 A1 | 7/2008 |
| EP | 0 745 114 B1 | 12/1996 |
| WO | WO 2007/138534 A1 | 12/2007 |

OTHER PUBLICATIONS

Antonietti, "Zauberkohle aus dem Dampfkochtopf", Max Planck Forschung (Feb. 2006), pp. 20-25.

Bergman et al., "Torrefaction for entrained-flow gasification of biomass", Energy research Centre of the Netherlands (ECN), ECN-C—05-067, (2004), pp. 1-50.

Carl et al., "Noell-Konversionsverfahren zur Verwertung und Entsorgung von Abfällen", EF, EF-Verlag für Energie- und Umwelttechnik GmbH, (1994), 84 pgs.

Henrich et al., "Das FZK—Project, Herstellung von Synthesekraftstoff aus Biomasse", KIT, Karlsruhe Institute of Technology, (2007), 58 pgs.

Kobayashi et al., "A new pulverized biomass utilization technology", Powder Technology, vol. 180, (2008), pp. 272-283.

Nikitin, "Die Chemie des Holzes", Akademie-Verlag Berlin, (1955), Table of Contents, 5 pgs.

International Search Report, PCT/EP2010/007181, Mar. 21, 2011, 3 pgs.

English translation of Chinese Office Action, Appl. No. 201080053352.3, Jun. 18, 2013, 10 pgs.

Chilean Examination Report dated Aug. 1, 2013, 8 pgs.

* cited by examiner

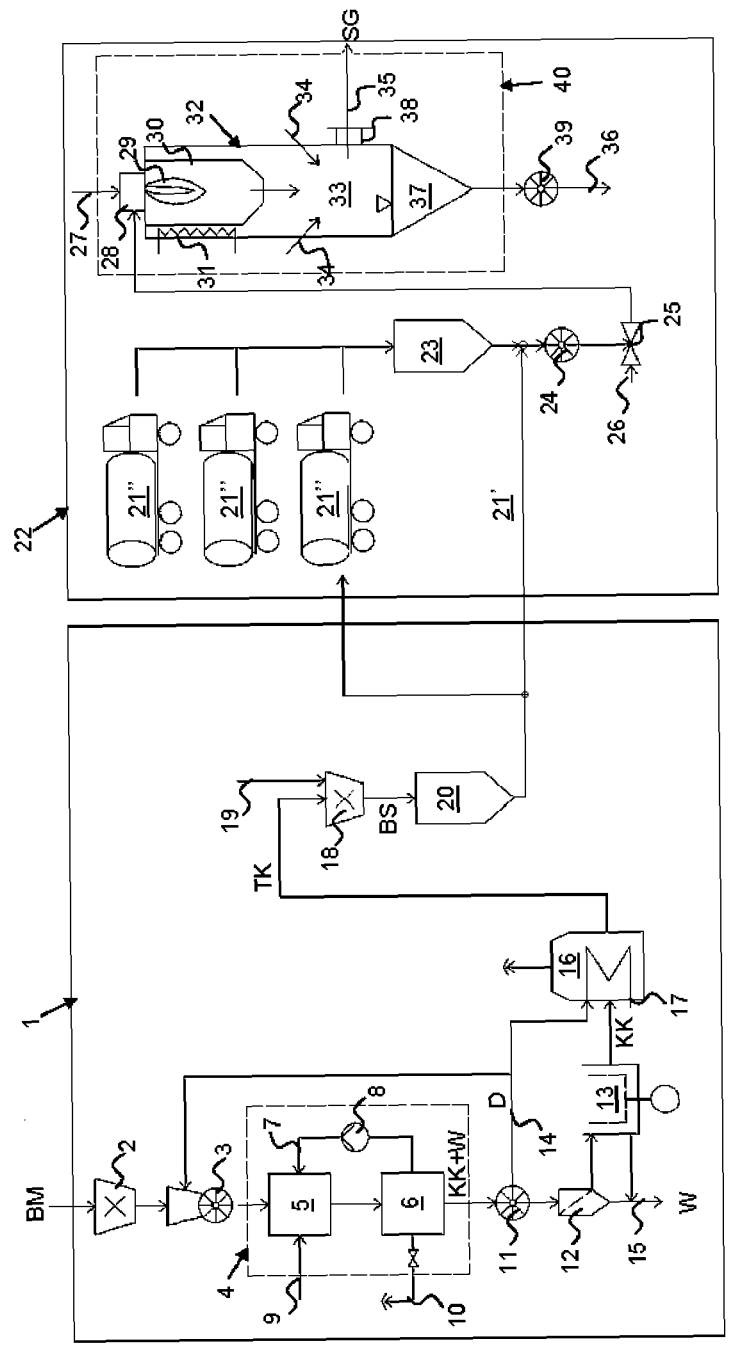

DEVICE AND METHOD FOR GENERATING A SYNTHESIS GAS FROM PROCESSED BIOMASS BY ENTRAINED-FLOW GASIFICATION

CROSS-REFERENCE TO RELATED PATENT APPLICATIONS

This application is a National Stage of International Application No. PCT/EP2010/007181, filed Nov. 26, 2010, which is based upon and claims the benefit of priority from prior German Patent Application No. 10 2009 055 976.0, filed Nov. 27, 2009, the entire contents of all of which are incorporated herein by reference in their entirety.

The invention relates to a device and to a method for generating a carbon monoxide- and hydrogen-rich, as well as tar-free and low in methane synthesis, burnable or reduction gas from biomass by entrained-flow gasification with a high conversion efficiency.

EP 0 745 114 B1 describes a method for gasifying biomass, which is known as a Carbo-V® method, the object of which is that of generating a tar-free burnable gas, with a lower consumption of oxygen-containing gasification media and higher gasification efficiency, while inorganic portions of the biomass are incurred as vitrified, elution-resistant product. To this end, the biomass is dried by the physical enthalpy of the gasification gas and decomposed into gas and coke by low-temperature carbonization, in accordance with a low-temperature gasification process (LTG process) disclosed in DE 198 07 988 B4. In the low-temperature gasification process, volatile matter is separated out of the biomass by thermal decomposition, wherein a tar-containing LTG gas and tar-free coke, which can be ground with relatively little energy expenditure, develop prior to the actual gasification.

The resulting tar-containing LTG gas is exothermically gasified with the residual coke developing in the dry gas scrubbing in a high-temperature entrained-flow gasification process at temperatures above the ash fusion point. In a second gasification stage, which is referred to as the endothermic gasification, the coke from the LTG process is added to the hot gasification gas from this stage. Due to the heat-consuming gasification reactions of the coke with the carbon dioxide and the steam of the hot gasification gas from the first stage to give carbon monoxide and hydrogen, the gasification gas cools to approximately 800 to 900° C.

Because of the thermal treatment stage of the low-temperature gasification, it is possible to feed biomass, in treated form, as LTG gas directly to the burner of the high-temperature entrained-flow gasification, and as coke via a suitable input element (dense phase conveyance, worm conveyor) to the endothermic gasification stage.

Using the Carbo-V® gasification, cold gas efficiencies can be achieved which correspond approximately to the efficiency of fluidized bed gasification, because the gasification end temperature is in the range of the temperature of the fluidized bed gasification despite the high-temperature gasification stage, during which the fuel ash is melted.

Compared to gas from fluidized bed gasification, the gasification gas from Carbo-V® gasification is low in methane and free from tar, because the tars were thermally destroyed in the high-temperature stage and the coke is free from tar in the endothermic stage.

The methane content and the content of higher hydrocarbons in the gas from the fluidized bed gasification result, for one, from the thermodynamically formed methane and, secondly, from the volatile hydrocarbons of the degasification process, which takes place in the fluidized bed gasification simultaneously with the heating, drying and gasification processes.

Methane and higher hydrocarbons are not synthesis gas components and must first be converted into carbon monoxide and hydrogen using suitable methods, for example reforming or partial oxidation, otherwise they decisively lower the yield of synthesis products.

The Carbo-V® process requires a large number of solid matter transfers, such as the inward transfer of biomass, the inward and outward transfers of the coke generated in the LTG process, because this is crushed at atmospheric pressure and must be freed from foreign matter (stones, metal parts, and the like), the outward and inward transfers of the residual coke, because this must be ground at atmospheric pressure to give pulverized fuel for dense phase conveyance, and the slag outward transfer. This process is therefore complex in terms of the method and prone to malfunctions.

A further drawback is the direct gas-side connection between the LTG reactor and the burner of the high-temperature gasification stage, which operate on one pressure level. Operating the method at high pressures of 30 bar and more, as is required to promote syntheses, necessarily results in increased expenditure for the many solid matter transfers. The direct coupling of the LTG reactor and entrained-flow gasification thus also does not allow any spatial and temporal separation of the thermal treatment of the biomass and the gasification of the treatment products, which can be advantageous both for the availability of the gasification process and for a central gasification of the remotely developing and treated biomass.

The pneumatic transport of carbon dust in entrained-flow gasifiers is state of the art.

The conversion of carbon-containing fuels, such as coal, gas and oil in the entrained flow to give burnable, synthesis and reduction gases is known from the prior art. The literature extensively describes methods using Shell gasification of coal and crude oil carrier gas, coal and waste oil gasification using the GSP method, which was developed at the German Fuel Institute (DBI) in Freiberg and the "Gaskombinat Schwarze Pumpe", and coal gasification according to Texaco, and the like.

In the gasification of coal, for example according to the GSP method, coal is ground to form pulverized fuel and introduced in the entrained-flow gasifier by means of pneumatic dense phase conveyance.

The grain spectrum generated when grinding the coal is adjusted such that even the largest particles are completely reacted to give gasification gas, or synthesis gas, wherein the reactivity of the fuel and the residence time of the particles in the reaction zone, which is determined by the size and throughput rate of the gasifier, must be observed. This means that a maximum grain diameter must not be exceeded. Typical grain spectra for the entrained-flow gasification of coal range between 50 and 500 µm (see "Noell-Konversionsverfahren zur Verwertung und Entsorgung von Abfällen" (Noell Conversion Process for Recycling and Disposing of Waste", Jürgen Carl, Peter Fritz, EF-Verlag für Energie-und Umwelttechnik GmbH, Berlin 1994).

In the entrained-flow gasification methods, which operate with water quenching for the purpose of cooling the gas and precipitating the dust, too high a fine grain portion, in contrast, causes the fine particles remaining in the gas, such as ash particles, to be precipitated only unsatisfactorily due the worse precipitability, because these fine particles are able to pass the filter.

In methods operating with radiant and convection cooling, a high fine grain portion results in increased pollution of the cooling surfaces and hence in worsened gas cooling.

With fine mineral powders having particle sizes of less than 50 μm, so-called flow aids are used to improve the flow properties of the dust, and thus the dosability in pneumatic conveyance (see, for example, http://www.basfcc.de/de/produkte/zementadditive).

So as to introduce fuel in entrained-flow gasification, it is also possible to employ coal-water suspensions, also referred to as slurry. This form of fuel input using water is substantially limited to hard coal and anthracite, because lignite, due to the high water absorption ability of the capillaries, requires large amounts of water until pumpability is reached, so that the energetic drawbacks prevail in the gasification process.

For fuels such as coke from biomass or coal, it is also possible to produce a pumpable suspension using burnable liquids such as tar oil, waste oil, naphtha, biodiesel and the like, for example the production of a suspension of coke with tar oil.

The fuel for use in entrained-flow gasification must be present either as a gas, pumpable liquid, solid-liquid suspension, or as a pneumatically conveyable pulverized fuel.

The mechanical crushing of dry biomass to give pulverized fuel requires a lot of energy because of the fibrous structure of the biomass, and the quality of the powder is not sufficient to assure smooth pneumatic conveyance, as is required for reliable operation and a stable gas quality, see "Torrefaction for entrained-flow gasification of biomass", presented during "The $2^{nd}$ World Conference and Technology Exhibition on Biomass for Energy, Industry and Climate Protection" in Rome, Italy, May 10-14, 2004, by Patrick C. A. Bergman, Arjen R. Boersma, Jacob H. A. Kiel, Energy Research Centre of the Netherlands (ECN).

The fibrous pulverized fuel obtained from biomass tends to agglomerate and accumulate in grain sizes that have a relatively large length-to-diameter ratio. The resulting discontinuous pneumatic conveyance, which is prone to malfunctions, can lead to short-term excess oxygen in the gasifier, and thus to the formation of explosive mixtures.

The direct use of solid biomass as a fuel in entrained-flow gasifiers is therefore not known.

Another path for treating biomass for entrained-flow gasification is highlighted by the Bioliq method described during a presentation entitled "Das FZK-Projekt, Herstellung von Synthesekraftstoff aus Biomasse" (The FZK Project, Production of Synthetic Fuel from Biomass), on the occasion of the International Conference 'Thermochemische Biomassevergasung' (Thermochemical Biomass Gasification), KUBUS, Leipzig Feb. 27-28, 2007, by E. Henrich, N. Dahmen, E. Dinjus, Karlsruhe Research Center, Institute for Technical Chemistry, CPV.

In this method, biomass is admixed to hot sand at ambient pressure using a mixed reactor known from the Lurgi-Ruhrgas process and thermally decomposed into coke and degasification gas by rapid pyrolysis. By cooling the degasification gas, tar oil is obtained, which is processed together with the coke separated from the sand bed to give a slurry, which is then added to an entrained-flow gasifier by means of pumps. The separation of coke and sand is never complete for either substance. The coke separated from the sand bed will always be contaminated with residual sand components and always is highly abrasive, and the separated sand will always be mixed with residual coke.

The remaining uncondensed gas and the residual carbon in the sand are used to cover the heat requirement of the pyrolysis by combustion, and hence heating of the sand.

By generating coke and tar oil, or slurry, this method makes it possible for the thermal treatment process to be temporally and spatially separated from the actual entrained-flow gasification process. This allows many small local generators of tar oil and coke, or slurry, to be combined in a central gasification system. Because of the higher energy density of the intermediate products as compared to the biomass, transport space, and therefore transport costs, for the remotely developing biomass can be saved.

The gas generated by the gasification of slurry is tar-free, and generally also virtually free from methane, because the gasification temperature is above the ash fusion temperature. The higher pressure, which with this method is easy to implement during gasification, has only little impact on the thermodynamic formation of methane at the high temperatures.

So as to ensure stable and reliable gasification, the two components must be supplied to the gasification process either separately or as a mixture at a constant mixing ratio. In particular the quality of the tar oil, and also that of the slurry, can fluctuate drastically because of the water content in the tar oil and result in phase separation, because tar oil and slurry are not storage-stable, resulting in an increased safety risk due to the potential oxygen breakthrough in the gasification.

An additional drawback of the Bioliq method is that more gas and residual carbon develops than is necessary for the heat requirement of the pyrolysis process. The cold gas efficiency, relative to the biomass used, is thus lower than with the Carbo-V® method and fluidized bed gasification. Another drawback is that, during cooling of the degasification gas, in addition to condensable hydrocarbons also the reaction water and drying water condense. The tar oil consequently contains quite a significant amount of water, which negatively influences the calorific value of the tar oil.

The excess heat, which has a high exergetic value, can, for example, be used for biomass drying or for external energy use.

Another method is described, amongst other things, in "Torrefaction for entrained-flow gasification of biomass", presented at the "The $2^{nd}$ World Conference and Technology Exhibition on Biomass for Energy, Industry and Climate Protection" in Rome, Italy, May 10-14, 2004, Patrick C. A. Bergman, Arjen R. Boersma, Jacob H. A. Kiel, Energy Research Centre of the Netherlands (ECN).

In this method, the dried biomass is thermally treated in a roasting process (torrefaction process) at temperatures of 200 to 300° C. and atmospheric pressure. In the process, a portion of the volatile components, primarily carbon dioxide and carbon monoxide, are removed. The mass yields of the torrefaction typically range from 70 to 90%, and the energy retained in the anhydrous biomass ranges from 83 to 97%, relative to the lower heating value.

In this treatment process, a part of the fibrous structure of the biomass is destructed, whereby the energy expenditure for grinding the torrefied product as compared to the original biomass decreases. The publication indicates an improvement in the powder quality over thermally untreated biomass powder with respect to pneumatic feeding properties. The quality of carbon powder, however, is not reached.

Having knowledge of the phases of the pyrolysis (from "Die Chemie des Holzes" (The Chemistry of Wood), N. I. Nikitin, Akademie-Verlag Berlin, 1955), it can be concluded that this process can only be conducted within a narrow temperature window. If the temperature is too low, long residence times and only insufficient improvement of the mechanical properties are to be expected, as the publication on the torrefaction process has confirmed. At temperatures above 300° C., a larger portion of volatile components is driven out the form of higher hydrocarbons (tars), and the process develops in the direction of pyrolysis with decreasing efficiency relative to the pyrolysis coke that is generated. Starting at 300° C., an exothermic phase is also to be expected, so that the process becomes difficult to control in terms of adhering to the temperature window.

So far, experiences are only available for wood and straw. No further findings about the usable biomass spectrum are known.

In the literature, "Zauberkohle aus dem Dampfkochtopf" (Magic Coal from a Pressure Cooker), MAXPLANCKFORSCHUNG, February 2006, described a method in which biomass, such as wood, straw, grass, organic waste and other inferior biomass, is converted into a carbonaceous substance and water at a pressure of approximately 20 bar, temperatures between 180 and 230° C., in the presence of an acid as the catalyst, and at a residence time of approximately 6 to 12 hours, by hydrothermal carbonization.

This method was already described in 1913 by Friedrich Bergius and carries out the carbonization process, taking place over millions of years, in just a few hours.

During this hydrothermal carbonization process, oxygen is separated primarily in the form of water. In addition, small amounts of carbon dioxide develop, and a small content of carbon of the biomass is dissolved in water. The oxygen bound in the biomass in the form of water and carbon dioxide is material "ballast" for the gasification process because it must be heated to the gasification temperature and appears in the generated gas as steam and carbon dioxide. Because of the heat requirement for heating the bound oxygen, an additional content of carbon monoxide and hydrogen is combusted to give carbon dioxide and steam. The share of this loss increases with the gasification temperature. Especially with entrained-flow gasification, where the gasification temperature is above the ash fusion temperature, this influence would contribute to a considerably worsened gas quality.

Corresponding to the "Zauberkohle aus dem Dampfkochtopf", the degree of utilization of the carbon in the char that is generated is almost 100%, relative to the biomass that is used, with hydrothermal carbonization; other publications describe a carbon utilization degree of more than 90% to 99%.

The energetic efficiency, which is found from the combustion heat of the anhydrous char, relative to the combustion heat of the anhydrous biomass, is more than 90%.

The hydrothermal carbonization process is exothermic ("Zauberkohle aus dem Dampfkochtopf", MAXPLANCKFORSCHUNG, February 2006).

By treating the biomass in the aqueous phase, water-soluble components, for example alkalis and halogens, are dissolved out of the ash.

Hydrothermal carbonization changes the structure of the biomass such that the carbonization char or charcoal that is generated, after drying, can be ground into pulverized fuel with considerably lower energy expenditure than the original biomass.

It is reported in "Zauberkohle aus dem Dampfkochtopf" that the biomass, after the thermal treatment, is present in the form of a conglomerate which is composed of nanoparticles and decomposes into smaller particles under low mechanical load. As a result, the energy requirement for crushing this treated biomass should be lower than for torrefaction material, for which energy savings of 50 to 85% over the untreated biomass were determined (see above, "Torrefaction of entrained-flow gasification of biomass").

DE 10 2007 062 811 A1, for example, describes a fuel obtained from biomass by hydrothermal carbonization which has a particle size of less than 50 μm, preferably in the nanometer range, which is to say considerably below the range of 50 to 500 μm suitable for entrained-flow gasification.

The method of hydrothermal carbonization is suitable for generating a fuel having a higher calorific value, the calorific value being similar to that of lignite, from biomass such as wood, straw, grass, organic waste and other inferior biomass, by separating oxygen, primarily in the form of bound water, wherein the fuel can be used with a higher conversion efficiency for energy generation than the original biomass.

Proceeding from this prior art, it is the object of the present invention to improve the production of synthesis gas from biomass with respect to high energetic efficiency, a high degree of carbon utilization, low complexity in terms of the equipment, and high flexibility of the method, wherein notably also the gasification of inferior biomass is to be made possible, for example garden waste, grass, agricultural products and waste products such as straw, residue from the processing of the biomass, and the like, using a high-temperature, high-pressure entrained-flow gasification process, so as to generate a tar-free synthesis gas that is low in methane and rich in carbon monoxide and hydrogen.

This object is achieved by a device having the characteristics of independent claim 1.

A corresponding method for generating a synthesis gas from biomass by entrained-flow gasification using the method according to the invention is disclosed by the features of claim 9.

Preferred embodiments are described in the dependent claims.

A first embodiment relates to a device which is used to generate a gasification gas being rich in hydrogen and carbon monoxide from any arbitrary biomass. The gasification gas, for example a synthesis gas, a burnable gas, or a reaction gas, is generated in an entrained-flow gasification plant, while the biomass is treated to give a conveyable fuel that is suitable for gasification in the gasification plant in a treatment plant that is connected upstream of the entrained-flow gasification plant.

For the treatment of the biomass to form the gasification-capable fuel, the biomass is first supplied to a coarse crushing device in the treatment plant. From the coarse crushing device, the biomass is conveyed through a first lock into a pressurized carbonization plant, in which the biomass undergoes hydrothermal carbonization. In the coarse crushing device, the biomass is thus crushed appropriately such that frictionless conveyance of the biomass through the lock and complete carbonization can take place within the intended residence time. The pressurized carbonization plant substantially comprises a carbonization reactor, in which the hydrothermal generation of carbonization char from the biomass takes place.

A preheating device can advantageously be connected upstream of the carbonization reactor and can alternatively be integrated in the carbonization reactor as a preheating zone. The heat released during the carbonization process can thus advantageously be used to preheat the biomass to be treated and/or to dry the char that is generated.

Proceeding from the pressurized carbonization plant, a second lock follows downstream, through which the aqueous carbonization char mixture resulting from the biomass is outwardly transferred from the carbonization plant to one or more solid-liquid separation devices so as to separate the free water, whereupon a fuel in the form of carbonization char is provided. Moreover, a drying device for drying the fuel or the carbonization char is provided downstream of the solid-liquid separation device(s), as well as a subsequent crushing device for the dried carbonization char. The crushing device is selected such that it crushes the carbonization char into pulverized fuel having a grain size distribution comprising grain sizes in a range of greater than 50 µm, for example 55 µm to 500 µm.

The fibrous structure of the biomass is advantageously changed due to the thermal treatment in the hydrothermal carbonization plant such that the carbonization char resulting from the biomass has a fibrous structure that can be ground, after drying, into the pulverized fuel at 50% to 85% less energy expenditure. The improved powder properties of the ground carbonization char as compared to the starting biomass improve the flow properties and increase the flow resistance of the carbonized char, and allow stable steady dense phase conveyance, which decisively increases the safety of the entrained-flow gasification process with respect to an oxygen breakthrough due to a discontinuous nature of the pulverized fuel conveyance.

So as to further optimize the properties of the char made from the biomass, this being the "biochar", flow and/or grinding aids can be added via a feed line in the crushing device to the dried char, whereby the fineness and water content of the dried char can be adjusted to the requirements of the conveyance and gasification processes.

By using hydrothermal carbonization instead of low-temperature gasification of a conventional Carbo-V process so as to generate the carbonaceous fuel for the downstream gasification stage, it is advantageously possible to use a wide spectrum of biomass. Using the treatment plant of the device according to the invention, it is possible, for example, to use not only high-quality biomass such as wood and wood waste, but any arbitrary biomass, in particular also inferior biomass, such as green waste, grass, agricultural products and biodegradable waste, comprising straw and residue from biomass processing. The fuel resulting from the inferior biomass by way of thermal treatment in the hydrothermal carbonization process, which is to say the carbonization char, can thus be made accessible to gasification, which constitutes a considerable economic advantage in light of the rising demand for wood, and thus rising prices.

Because biomass generally develops remotely, the biomass would have to be moved from a large catchment area to a central gasification location for a large gasification plant. By decoupling the treatment of the biomass from gasification, which is now possible because of the hydrothermal carbonization process, local treatment of the biomass to form gasifiable fuel is made possible at any arbitrary number of locations using appropriately dimensioned treatment plants, whereby the treated fuel, given the higher energy density thereof as compared to the biomass, can be transported to the gasification plant at lower transport expenditure/cost, thus allowing, in the overall, improved utilization of the entire device, which represents a considerable economic advantage.

So as to supply the fuel generated in the treatment plant to the entrained-flow gasification plant, the device according to the invention comprises a transfer device. When a treatment plant is provided in the direct vicinity of a gasification plant, the transfer device, in the simplest case, is formed by a conveying means for the fuel, which is arranged between the treatment plant and the gasification plant. In accordance with the advantageous embodiment of the invention, comprising local treatment plants and a central gasification plant, the transfer device, which couples the treatment plant(s) to the entrained-flow gasification plant, will be a transport means, such as truck, for transferring the fuel.

A further advantage of the carbonization plant used according to the invention is that the hydrothermal carbonization takes place in the aqueous phase, so that any preceding, energetically complex drying of the biomass is superfluous. Moreover, the water, which is separated during carbonization and is present with the excess heat of the exothermic process, can be utilized to preheat the biomass. Because the carbonization takes place in the aqueous phase, the required temperature window can be maintained more easily and reliably than, for example, with the torrefaction method, which takes place in the gas phase.

In addition to the treatment plant, which provides fuel that is suitable for entrained-flow gasification from biomass, the device according to the invention comprises an entrained-flow gasification plant, which in one embodiment comprises a supply unit, which can be coupled to the transfer device, for the fuel that was transferred from the treatment plant. Downstream, a lock connects to the fuel supply unit and can be used to feed the fuel to a pressurized conveyor system. The conveyor system for the fuel leads into a high-temperature entrained-flow gasification device, which is under increased pressure and from which an outward transfer pipe for slag and a product line for the synthesis gas extend.

Such an entrained-flow gasification device may comprise one or more burners, wherein each burner can be associated with a supply line for a gasification medium. The burner leads, or the burners lead, into an entrained-flow gasification reactor, which comprises a reaction chamber and, downstream thereof, a cooling chamber. The wall of the reaction chamber can be equipped with a fireproof lining and, as an alternative or in addition, may comprise a cooling device, which can, for example, be arranged on or in the wall of the reaction chamber. Moreover, a discharge device, which can be connected to the product line, for the synthesis gas extends from the cooling chamber.

In one embodiment, the cooling chamber may be a quenching chamber, which has a plurality of supply lines for quenching water and/or quenching gas. As an alternative, the cooling chamber may also be equipped for indirect gas cooling using a radiant cooler, to which a convection cooler can be connected. In a combination comprising quenching and indirect gas cooling, the cooling chamber can be designed as a quenching chamber and additionally comprise a device for indirect gas cooling, which connects to the quenching chamber. Preferably, a convection cooler can be connected downstream of the quenching chamber.

A slag sump of the entrained-flow gasification reactor is located downstream of the reaction chamber, so that the liquid slag travels from the reaction chamber, following gravity downward, into the slag sump, and from there can be removed as solidified slag granules via a fourth lock via the outward transfer pipe.

Advantageously, the device according to the invention can be used to convert the fuel obtained from the hydrothermal carbonization of (inferior) biomass into a tar-less, low-methane burnable, gasification or synthesis gas in the entrained-flow reactor. In the entrained-flow reactor, the high process pressures of 30 bar and higher, which are customary in particular for synthesis processes, can be implemented at a comparable or even higher gasification efficiency and fuel utilization degree than according to the prior art, while also being able to achieve higher specific throughput, which leads to lower production costs in the production of synthesis gas as compared to the prior art.

The entrained-flow gasification process, which due to a uniform fuel is advantageously single-staged, is technologically simpler than a multi-stage gasification process and therefore requires merely a pulverized fuel lock transfer and a slag lock transfer, whereas at least six lock transfers are required for multi-stage Carbo-V® gasification with low-temperature gasification of the biomass. The gasification plant of the device can thus be designed with less apparatus-related cost than a conventional Carbo-V® gasification plant, and thus investment and operating costs can be saved, while also increasing the availability of the entrained-flow gasification plant. By eliminating the plurality of lock transfer processes, and due to the eliminated forced coupling between treatment and gasification, additionally higher process pressures are easier to implement in gasification. Subsequent compression of the gas generated in the gasification process to the higher pressure in a synthesis plant can thus be eliminated, if the gasification gas is intended to be used as a synthesis gas.

In an advantageous embodiment of the device according to the invention, a pneumatic dense phase conveyance system is provided as the conveyor system when the fuel is the pulverized fuel obtained by drying and grinding. The pulverized fuel is charged, by passages through the locks, into the pressurized dense phase conveyance system and transferred into the entrained-flow gasification process by feeding conveying gas through one or more conveying gas lines.

As an alternative to a pneumatic dense phase conveyance system for pulverized fuel, the conveying system can also be a pump conveying system, wherein the fuel is present in the form of a hydraulically conveyable fuel slurry. The fuel slurry comprises the fuel and a burnable liquid, wherein the fuel can be the pulverized fuel or even the carbonization char obtained from the carbonization process after dewatering. So as to provide the fuel slurry, a slurry device, into which a supply device for the burnable liquid leads, is provided either in the entrained-flow gasification plant upstream of the pump conveying system, or in the treatment plant downstream of the solid-liquid separation device.

The invention further relates to a method for generating a synthesis gas from biomass by entrained-flow gasification, wherein the fuel for the entrained-flow gasification comes from a hydrothermal carbonization process of the biomass. So as to carry out the method, one of the embodiments of the device according to the invention may be used. In a first sub-method, the fuel suitable for gasification in the entrained-flow gasification plant is generated from the biomass in a treatment plant. For this purpose, the biomass is coarsely crushed in the coarse crushing device, and thereupon conducted through the first lock and supplied to the pressurized carbonization plant. There, the coarsely crushed biomass can advantageously be preheated in the preheating device, or in the preheating zone integrated in the carbonization reactor, whereupon the hydrothermal carbonization of the preheated biomass in the carbonization reactor follows so as to obtain a mixture of carbonization char and water. In the following step, the carbonization char and water mixture is transferred through the second lock into the solid-liquid separation device(s), where the water is separated from the carbonization char, so that dehydrated carbonization char is provided as the fuel.

The dehydrated carbonization char is transferred to a drying device, where it is dried to form dried char. This dried char is then transferred into a crushing device, in which the dried char is crushed into pulverized fuel having particle sizes in the range of greater than 50 µm, approximately 55 µm to 500 µm. This pulverized fuel is suitable for pneumatic conveyance and for gasification, and can also be used to produce a hydraulically conveyable fuel slurry, wherein it is processed in a slurry device, together with a burnable liquid, to form a pumpable slurry that can be gasified in the entrained flow.

Optionally, the dehydrated carbonization char can be used as fuel in the entrained-flow gasification plant, and more specifically in the form of a fuel slurry, if the carbonization char was processed in a slurry device together with a burnable liquid to give slurry.

The steps of hydrothermal carbonization, drying and crushing can be carried out independently from each other, both temporally and spatially, depending on the available biomass and the type and quantity of the desired fuel. In particular so as to improve grinding, and also so as to improve the quality of the resulting pulverized fuel in terms of the flow properties thereof, a grinding and/or flow aid can be supplied to the crushing device during the grinding step.

The fuel generated during treatment is transferred by means of the transfer device to the entrained-flow gasification plant, where the synthesis gas is generated by gasifying the fuel in the high-temperature gasification reactor. The entrained-flow gasification of the fuel obtained from the biomass takes place exothermically at temperatures of 1200° C. to 1600° C. in the presence of oxygen at a pressure of at least 3 bar, and preferably above 40 bar.

The efficiency of hydrothermal carbonization is considerably greater than the efficiency of low-temperature gasification/rapid pyrolysis, primarily because of the better carbon balance. For example, at comparable gasification efficiencies, the efficiency of the overall process of gasifying biomass (including thermal treatment) with the method according to the invention, using hydrothermal carbonization, is considerably higher than the efficiency, for example, with the Bioliq method, which manifests itself in a higher yield of synthesis gas.

It is further advantageous that the cold gas efficiency of the overall method, including hydrothermal carbonization and entrained-flow gasification, is comparable to the cold gas efficiency of the Carbo-V® method, despite high-temperature gasification, because oxygen is separated in the hydrothermal carbonization process.

By dissolving water-soluble alkalis and halogens out of the biomass substance in the thermal treatment stage of hydrothermal carbonization, which can then be separated in the solid-liquid separation with the water and disposed of, the ash content and content of harmful substances of the fuel are decreased. The gasification process is thus subject to a lower ash quantity and harmful substance load, which leads to energetic advantages and lower expenditure in gas scrubbing. At the same time, nutrients dissolved out with the waste water can be recirculated to the nutrient cycle.

These and further advantages will be demonstrated by the following description with reference to the accompanying drawing.

The reference to the FIGURE in the description serves to support the description and an easier understanding of the subject matter. The FIGURE is merely a schematic illustration of one exemplary embodiment of the invention.

FIG. 1 shows a method flow chart of one embodiment of the device according to the invention, comprising a treatment plant, a transfer device, and an entrained-flow gasification plant comprising quenching by means of water.

The device according to the invention combines the devices for carrying out the method steps of hydrothermally carbonizing biomass to form carbonization char (char) and of high-temperature entrained-flow gasification of the char generated from the biomass. This char can either be processed into a carbon slurry, in which the carbonization char is suspended in a burnable liquid, or the generated char can be subjected in a preferred embodiment to a drying step, following by a grinding operation of the char, so that a pneumatically conveyable pulverized fuel is provided, which can be supplied to the high-temperature entrained-flow gasification by dense phase conveyance.

The individual method steps of hydrothermally carbonizing the biomass, drying the carbonized char, grinding the dried char, and gasifying the pulverized fuel can be implemented in separate locations, and more particularly the hydrothermal carbonization of the biomass can be performed locally in smaller units in the vicinity of where biomass develops, whereby transportation costs can be reduced.

The flow and gasification properties of the dried char can optionally be improved by adding flow and grinding aids prior to or during the grinding of the dried char. If necessary, the flow properties can thus be improved, and good dosability of the generated powder in the pneumatic conveyance can be ensured.

As mentioned above, as an alternative to the pneumatic dense phase conveyance, it is possible to supply the carbonized, mechanically dewatered biomass, after being mixed into a slurry with burnable liquids, such as tar oil, waste oil, distillate residues, naphtha, biodiesel and other burnable liquids, to the high-temperature high-pressure entrained-flow gasification by means of pumps.

According to the invention, in addition to wood or wood waste, it is also possible to process inferior biomass such as green waste, grass, agricultural products and waste products such as straw, residue from biomass processing and the like, and to gasify it with high conversion efficiency to form carbon monoxide-rich and hydrogen-rich, tar-free and low-methane synthesis gas, or also burnable or reduction gas.

The method according to the invention concerns the separation of a portion of oxygen from the biomass to be gasified, initially during thermal carbonization, primarily in the form of bound water, and in small amounts in the form of carbon dioxide.

Because of the separation of oxygen, the calorific value of the carbonization char (char) that is generated, relative to the dry substance, increases as compared to the calorific value of the biomass that is used, which contributes to a significant improvement of the gas quality during the subsequent gasification process.

Due to the treatment in the aqueous phase, water-soluble alkalis and halogens are dissolved out of the fuel containing these minerals, and thus these do not find their way into the gasification process, where they are incorporated in the slag in an elution-resistant manner. As a result, they can be recirculated to the nutrient cycle.

After the carbonization process, the char can be dried to water contents typical of pulverized fuel and subsequently ground into pneumatically conveyable pulverized fuel.

The carbonization process largely breaks open the fibrous structure of the biomass, so that the dried carbonization char can be ground with lower energy expenditure than the original biomass, wherein the generated pulverized fuel has a better grain shape, which contributes to an improvement in the pneumatic conveyability of the powder, and thus to a reliable and quality oriented gasification process.

The grain spectrum during grinding is advantageously adjusted such that the grain size of the generated powder primarily ranges between 55 and 500 µm. This not only assures complete conversion of the fuel in the gasifier, it also allows good powder separation to be achieved, even with respect to the lower grain limit, during quenching by means of water, or in the wet gas scrubbing process. Moreover, excessive contamination of heat transfer surfaces in gas cooling can be prevented because an excessively fine grain content is avoided.

The pulverized fuel is supplied via a pneumatic dense phase conveyance system, which is suitable for high operating pressures, to the entrained-flow gasifier, where it is reacted, together with the oxygen-containing gasification medium, to form synthesis gas that is low in methane and rich in carbon monoxide and hydrogen.

A method according to the invention will be described in detail hereafter by way of example based on the device according to the invention shown in FIG. 1.

A preferred method in general comprises the sub-methods of hydrothermally carbonizing the biomass BM to form carbonization char KK, separating oxygen primarily in the form of water W, of drying and grinding the generated char to form pulverized fuel BS in the treatment plant 1, transporting the pulverized fuel BS from the treatment plant 1 to a high-temperature entrained-flow gasification plant 22, conveying the pulverized fuel BS by way of pneumatic dense phase conveyance into an entrained-flow gasifier 40, and gasifying the pulverized fuel BS using a gasification medium contained in the oxygen in the entrained flow.

The biomass BM is treated at a location of the treatment plant 1, which is remote from the location of the entrained-flow gasification plant 22, to form the conveyable fuel, which in the present example is a pulverized fuel BS. To this end, the biomass BM is crushed in a suitable crusher 2 until it can no longer cause any mechanical problems in the subsequent process, for example during conveying of the biomass BM through the lock 3, and the crushed biomass BM is carbonized all the way in the carbonization plant 4 during the residence time intended for hydrothermal carbonization. Except for coarsely crushing the biomass BM in the crusher 2, no further preparation steps are thus required prior to carbonization, and prior drying of the biomass BM is not necessary because the carbonization process takes place in the aqueous phase.

It is likewise not required to sort the biomass with respect to biomass-specific properties such as grain size, quality, structure and other properties, to allow each type of biomass to be easily treated using the method according to the invention.

The coarsely crushed biomass is charged via the lock 3 to the carbonization plant 4, which is subjected to a pressure of approximately 20 bar. Prior to the charging to the carbonization plant 4, the crushed biomass can optionally, as shown in FIG. 1, be preheated using flash steam D, which originates from a downstream method stage and can be supplied via a steam pipe 14. At this point, the biomass can optionally also be mixed with a catalyst (not shown in FIG. 1) and thus be supplied, advantageously in preheated form using process heat, via the lock 3 first to the preheating device 5 of the carbonization plant 4 for hydrothermal carbonization. There, the biomass is preheated using hot water, if necessary additionally pressurized steam can be supplied via a pressurized steam supply pipe 9 leading into the preheating device 5 so as to cover the heat requirement, or for the start-up process. The hot water used in the preheating device 5 advantageously originates from the carbonization process in the carbonization reactor 6, in which the exothermic reaction of the biomass to form carbonization char KK takes place, wherein process water W is separated, which is then recirculated to the preheating device 5 via a hot water line 7 by means of the pump 8.

After the preheating in the preheating device 5, the mixture comprising the biomass and water thus reaches the carbonization zone 6, in which oxygen is separated, primarily in the form of bound water, and also in small quantities in the form of carbon dioxide, at temperatures between 180 and 230° C. and a residence time of approximately 6 to approximately 24 hours. This breaks open the fibrous structure of the biomass, so that the generated carbonization char KK decomposes already here, in the carbonization stage, into smaller grain sizes than those of the biomass in the input state.

Because the carbonization process is exothermic, the heat developing during carbonization, as described above, can be discharged in the form of hot water W to the preheating zone 5.

The gas which also develops as an oxygen separation product, and which is primarily carbon dioxide, is discharged to the atmosphere together with the steam contained in the gas in a pressure-controlled manner by means of a valve via the outlet 10. Any excess heat from the exothermic zone of carbonization can, at this point, be safely discharged in the form of a larger amount of steam. It is also possible to utilize the enthalpy contained in the gas.

The carbonization char KK that is formed is outwardly transferred, together with the excess water W, from the pressurized hydrothermal carbonization plant 4 via the lock 11 and depressurized. A portion of the water evaporates because of the high temperature of the char KK and water W. So as to preheat the crushed biomass BM in the receiving tank of the lock 3 or, for example, downstream via the steam pipe 14, this steam D can, as mentioned above, be supplied to a heat exchanger device 17 of the drying device 16 and be used there for drying the dewatered carbonization char KK.

First, however, the carbonization char KK resulting from the biomass BM is separated from the free water W in a separation device 12 and a mechanical dewatering unit 13, such as a centrifuge, a chamber filter press, wire press or screw press, the water being discharged both from the separation device 12 and from the mechanical dewatering unit 13 via a waste water pipe 15. The waste water W may contain dissolved carbon compounds and dissolved ash components such as alkalis and halogens. If pollutant compounds are present, these must be removed from the waste water before it is delivered to a waste water treatment plant.

Subsequent to mechanical dewatering, the carbonization char KK is dried in a thermal drying device 16 using pressurized steam D, or another heat transfer medium flowing through the heat exchanger 17, to customary residual water contents of less than 10%.

The dried carbon TK thus obtained is thereupon crushed in a subsequent crushing device 18 to form pneumatically conveyable pulverized fuel BS, the grain size of which primarily ranges above 55 and below 500 μm. Common crushing devices 18 can, for example, be ball mills, roller mills and the like.

Because the fibrous structure of the biomass was substantially broken up in the carbonization process, the energy expenditure for grinding the dried char TK is comparable to that of fossil coal. So as to reduce the time expenditure for the grinding operation and improve the flow properties of the pulverized fuel BS, a grinding and/or flow aid can be metered to the mill 18 via a suitable supply 19.

The generated powder BS can first be deposited or stored on an intermediate basis in a silo 20 approved for pulverized fuel and subsequently be transferred to the location of the entrained-flow gasification plant 22. FIG. 1 shows the transfer by a conveying pipe 21' or by transport vehicles 21".

According to the invention, a device may comprise a plurality of such treatment plants 1 in various locations, in which the remotely developing biomass BM is locally treated and transported by means of the transport vehicles 21" to the location of the entrained-flow gasification plant 22.

At the site of the gasification plant 22, which advantageously is located centrally with respect to the treatment locations, the pulverized fuel is conveyed out of the transport vehicle 21", together with pulverized fuel that was transported from other locations to the gasification location by means of transport vehicles 21", to a pulverized fuel silo 23 and deposited there on an intermediate basis. If the treatment plant 1 and the entrained-flow gasification plant 22 are in the same location, the alternative coupling thereof via a conveying pipe 21' is advantageous.

For gasification, the pulverized fuel is transferred via a lock 24 to the dense phase conveyance system 25, where it is transported with the aid of a conveying gas that is supplied via a conveying gas line 26 to the burner 28 of the high-temperature entrained-flow gasification device 40, the operating pressure of which is at least 3 bar and preferably can exceed 40 bar.

Via a separate supply unit 27 of the burner 28, an oxygen-containing gasification medium is supplied to the gasification reactor 32, which can be pure oxygen or consist of an oxygen-steam mixture, an oxygen-carbon dioxide mixture, or a mixture of oxygen, steam and carbon dioxide. In the reaction chamber 30, which in the present example is cooled by a cooling device 31 and can be lined with fireproof material, the pulverized fuel and the gasification medium react at the outlet of the burner mouth 29 in a flame reaction at temperatures above the ash fusion temperature, which is typically 1200° C. to 1600° C., and preferably 1400° C. to 1500° C., and at pressures above 3 bar, and preferably above 40 bar, to form a tar-free gasification gas SG, which is low in methane and rich in carbon monoxide and hydrogen and which flows out of the reaction chamber 30 into the quenching chamber 33 arranged underneath.

In addition, a convection cooler, which is not shown in FIG. 1, may connect to the quenching chamber 33, so that a combination of partial quenching with indirect gas cooling is possible, or the cooling chamber can comprise a radiant cooler as an alternative to quenching, and a convection cooler can likewise potentially connect to this radiant cooler. The arrangement of the cooling chamber, whether it is the quenching chamber 33 or a chamber for indirect gas cooling, for which the cooling chamber is provided with radiant and/or convection heat transfer surfaces, depends on the possible outflow of the gas from the reaction chamber 30. Outflow is possible upward, downward and downward in conjunction with a deflection of the gas, which can be as much as 180°. The cooling chamber can thus be arranged above, beneath or next to the reaction chamber, and in the present example in FIG. 1, the arrangement of the cooling or quenching chamber 33 beneath the reaction chamber 30 is shown.

The ash of the pulverized fuel melted in the flame reaction is thrown against the wall of the reaction chamber 30 as a result of the swirl of the burner 28 and runs there, as liquid slag, onto a layer of solid slag, which in the present example has formed on the fireproof material of the reaction chamber 30 due to the cooling unit 31 and, at the outlet of the reaction chamber 30, drops through the quenching chamber 33 in the slag bath 37, wherein it solidifies to form vitreous granules. The solid slag is discharge from the process via the lock 39 by means of an outward transfer pipe 36.

Independently of the gas outflow, the liquid slag is always discharged downward out of the reaction chamber 30 into the slag sump, from where it is outwardly transferred after solidification to form granules. For the case of downward gas discharge without deflection, shown in FIG. 1, the slag, together with the gas, first passes through the quenching chamber 33 before it reaches the slag sump 37. Otherwise, which is to say with deflection of the gas outflow or with upward gas outflow, the liquid slag is separated from the gas flow due to gravity as result of the deflection of the gas flow, or is transferred directly into the slag sump.

The hot gasification gas flowing out of the reaction chamber 30 can be cooled in the quenching chamber 33 using quenching water, which is injected via supply lines 34, to a temperature of approximately 500 to 1000° C. (partial quenching) so as to then be supplied, for example, to convection cooling, or, as an alternative, it can be cooled to a temperature of approximately 200 to 250° C. (complete quenching) so as to then be supplied, for example, to a substance conversion stage. The cooled gasification gas enriched with steam leaves the gasification reactor 32 as raw gasification gas, or synthesis gas SG, via the gas outlet port 38 and can be supplied via a product pipe 35 to a downstream process stage (not shown).

The method according to the invention for the entrained-flow gasification of biomass can be used to convert wood, wood waste, green waste, grass, agricultural products and waste products such as straw, residues from biomass process and the like, and hence inferior biomass, into burnable, synthesis and/or reduction gases that are rich in carbon monoxide and hydrogen, tar-free and low in methane, with high conversion efficiency.

This is achieved by combining hydrothermal carbonization, drying of the char generated from the biomass, grinding the char, dense phase conveyance, and entrained-flow gasification to give burnable, synthesis and/or reduction gases. To this end, the entrained-flow gasifier, which is subjected to positive pressure, is supplied with carbon-enriched pulverized fuel having a particle size of less than 500 µm, and preferably between 55 and 500 µm, by means of a pneumatic dense phase conveyance system, wherein the entrained-flow gasifier, including the burner, reaction chamber and cooling unit, can have a technically simple design given the uniform fuel structure, requiring only two lock transfers.

To this end, the method steps of the hydrothermal carbonization, drying and grinding can be carried out spatially and temporally separate from each other, and separately from the gasification location, so that, depending on where the biomass develops, the treated biomass can be transferred into the corresponding devices for carrying out the method steps depending on the further processing and/or the intended purpose.

In an alternative method, for example, the char generated from the biomass may not be conveyed pneumatically to the entrained-flow gasifier, but may be mixed with a burnable liquid, such as tar oil, waste oil, naphtha, biodiesel or other burnable liquids to form a slurry, and this fuel slurry may be pumped into the entrained-flow gasifier. The slurry can be generated in the gasification plant 22, wherein the burnable liquid is supplied upstream of the gasification reactor 40, and the slurry is pumped to the burner 28 by means of a pump system. The supply unit for the burnable liquid could correspond to the conveying gas pipe 26 shown in FIG. 1, and the pump system could correspond to the dense phase conveyance system 25. The fuel mixed into a slurry with the burnable liquid can be a pulverized fuel BS, and in some circumstances the carbonization char KK directly after hydrothermal carbonization can be used as the fuel, with subsequent dewatering, whereby the drying and grinding steps can be eliminated.

As a further alternative, the fuel slurry is already conceivably produced at the location of the treatment plant 1, so that it is not pulverized fuel, but the fuel slurry that is to be transported to the gasification plant.

The invention claimed is:

1. A device for generating a synthesis gas from a biomass by entrained-flow gasification, comprising:
    (a) a treatment plant for the biomass, comprising
        a first coarse crushing device for the biomass,
        a first lock,
        a pressurized carbonization plant for hydrothermal generation of carbonization char from the biomass,
        a second lock,
        a solid-liquid separation device for providing a fuel,
        a drying device for drying the fuel, and
        a second crushing device,
        wherein the first coarse crushing device is connected downstream via the first lock to the pressurized carbonization plant,
        wherein the pressurized carbonization plant comprises a preheating device, a carbonization reactor arranged downstream of the preheating device, and a hot water line extending from the carbonization reactor to the preheating device for recirculating process water,
        wherein the carbonization reactor downstream via the second lock to the solid-liquid separation device,
        wherein the solid-liquid separation device is connected downstream to the drying device,
        wherein the drying device is connected downstream to the second crushing device, and
        wherein the second crushing device provides crushing of the fuel to form a pulverized fuel having particle sizes in the range of 55 µm to 500 µm;
    (b) a transfer device for transferring the fuel; and
    (c) an entrained-flow gasification plant,
        wherein the transfer device provides a coupling of the treatment plant to the entrained-flow gasification plant, and
        wherein the entrained-flow gasification plant is located remotely from the treatment plant.

2. The device according to claim 1, wherein the biomass comprises wood, wood waste, green waste, grass, agricultural products, and waste products comprising straw and residue from biomass processing.

3. The device according to claim 1, wherein the second crushing device is connected to a supply line for aids, in particular for grinding and/or flow aids.

4. A device according to claim 1, wherein the entrained-flow gasification plant comprises a fuel supply line, which can be coupled to the transfer device and which is connected downstream via a third lock to a fuel conveying system leading into an entrained-flow gasification device.

5. The device according to claim 4, wherein
    the entrained-flow gasification device comprises at least one burner, into which a supply line for a gasification medium leads and which is connected to an entrained-flow gasification reactor,
        wherein the entrained-flow gasification reactor comprises a reaction chamber that is equipped with a fireproof lining and/or a cooling device and, downstream of the reaction chamber, comprises a cooling chamber, from which an outward transfer pipe for slag and a product line for the synthesis gas extend.

6. The device according to claim 5, wherein the cooling chamber comprises:
    a quenching chamber having a plurality of supply lines for quenching water and/or quenching gas,
    a device for indirect cooling by means of a radiant and/or convection cooler, or
    a combination of the quenching chamber and the device for indirect gas cooling.

7. The device according to claim 5, wherein downstream of the reaction chamber, the entrained-flow gasification reactor comprises a slag sump, from which the outward transfer pipe extends over a fourth lock.

8. A device according to claim 4, wherein the conveying system comprises:
- a pneumatic dense phase conveyance system, which comprises at least one conveying gas line when the fuel is a pulverized fuel, or
- a pump conveying system when the fuel is provided in the form of a hydraulically conveyable fuel slurry, which comprises the fuel and a burnable liquid, wherein the fuel slurry is provided in a slurry device, which is arranged upstream of the pump conveying system in the entrained-flow gasification plant or treatment plant and comprises a supply device for the burnable liquid.

* * * * *